United States Patent
Surace et al.

(10) Patent No.: US 11,965,453 B2
(45) Date of Patent: Apr. 23, 2024

(54) THERMAL MANAGEMENT ASSEMBLY OF A VEHICLE

(71) Applicant: INDUSTRIE SALERI ITALO S.P.A., Lumezzane (IT)

(72) Inventors: Alfonso Surace, Lumezzane (IT); Marco Pedersoli, Lumezzane (IT); Simone Cornacchia, Lumezzane (IT)

(73) Assignee: Industrie Saleri Italo S.p.A., Lumezzane (IT)

( * ) Notice: Subject to any disclaimer, the term of this patent is extended or adjusted under 35 U.S.C. 154(b) by 249 days.

(21) Appl. No.: 17/642,801

(22) PCT Filed: Sep. 16, 2020

(86) PCT No.: PCT/IB2020/058592
§ 371 (c)(1),
(2) Date: Mar. 14, 2022

(87) PCT Pub. No.: WO2021/074711
PCT Pub. Date: Apr. 22, 2021

(65) Prior Publication Data
US 2022/0397051 A1 Dec. 15, 2022

(30) Foreign Application Priority Data
Oct. 14, 2019 (IT) .................. 102019000018710

(51) Int. Cl.
*F01P 7/16* (2006.01)
*B60K 6/26* (2007.10)
(Continued)

(52) U.S. Cl.
CPC .................. *F01P 7/16* (2013.01); *B60K 6/26* (2013.01); *B60K 6/28* (2013.01); *B60K 11/02* (2013.01);
(Continued)

(58) Field of Classification Search
CPC . B60K 11/02; B60K 6/24; B60K 6/26; B60K 6/28; B60L 58/24; F01P 7/16;
(Continued)

(56) References Cited

U.S. PATENT DOCUMENTS

| 5,251,588 A | 10/1993 | Tsujii et al. |
| 2005/0000473 A1 | 1/2005 | Ap et al. |

(Continued)

FOREIGN PATENT DOCUMENTS

GB 2383840 A 7/2003

OTHER PUBLICATIONS

International Search Report and Written Opinion for International Patent Application No. PCT/IB2020/058592, dated Dec. 8, 2020, 11 pages.

*Primary Examiner* — Syed O Hasan
(74) *Attorney, Agent, or Firm* — Armstrong Teasdale LLP

(57) ABSTRACT

A thermal management assembly includes a first pump group and a second pump group connected by an auxiliary duct, a first inlet and a second inlet respectively connected to the first and second pump groups, a first outlet, a second outlet and a third outlet, and a fluidic command device fluidically connected to the first and the second pump groups and to the auxiliary duct. The fluidic command device is configurable in a first configuration in which flow of working fluid is regulated through the first and second outlets, preventing flow through the third outlet and the auxiliary duct, a second configuration in which flow of working fluid is regulated through the third outlet, preventing flow through the auxiliary duct, and a third configuration in which flow of working fluid is regulated through the auxiliary duct and flow of working fluid exiting through the second outlet is also regulated.

18 Claims, 13 Drawing Sheets

(51) Int. Cl.
  *B60K 6/28*   (2007.10)
  *B60K 11/02*  (2006.01)
  *B60L 58/24*  (2019.01)
  *F01P 3/20*   (2006.01)
  *F01P 5/10*   (2006.01)
  *F04D 13/12*  (2006.01)

(52) U.S. Cl.
  CPC ............... *B60L 58/24* (2019.02); *F01P 3/20* (2013.01); *F01P 5/10* (2013.01); *F04D 13/12* (2013.01)

(58) Field of Classification Search
  CPC .......... F01P 3/20; F01P 5/10; F01P 2005/105; F01P 2060/00; F04D 13/12; F04D 15/0005
  See application file for complete search history.

(56) References Cited

U.S. PATENT DOCUMENTS

| | | | |
|---|---|---|---|
| 2014/0374081 A1* | 12/2014 | Kakehashi | B60H 1/00278 429/120 |
| 2015/0000327 A1* | 1/2015 | Kakehashi | H01M 10/625 62/434 |
| 2015/0101789 A1* | 4/2015 | Enomoto | B60H 1/039 236/35 |
| 2015/0217622 A1* | 8/2015 | Enomoto | F16K 11/076 62/244 |
| 2016/0031291 A1* | 2/2016 | Enomoto | B60K 11/02 62/189 |
| 2016/0167481 A1* | 6/2016 | Makihara | B60H 1/03 237/5 |
| 2016/0339761 A1* | 11/2016 | Enomoto | B60H 1/00899 |
| 2019/0160910 A1* | 5/2019 | Mano | F16K 11/085 |
| 2021/0129805 A1* | 5/2021 | Abaitancei | F16H 61/4096 |

* cited by examiner

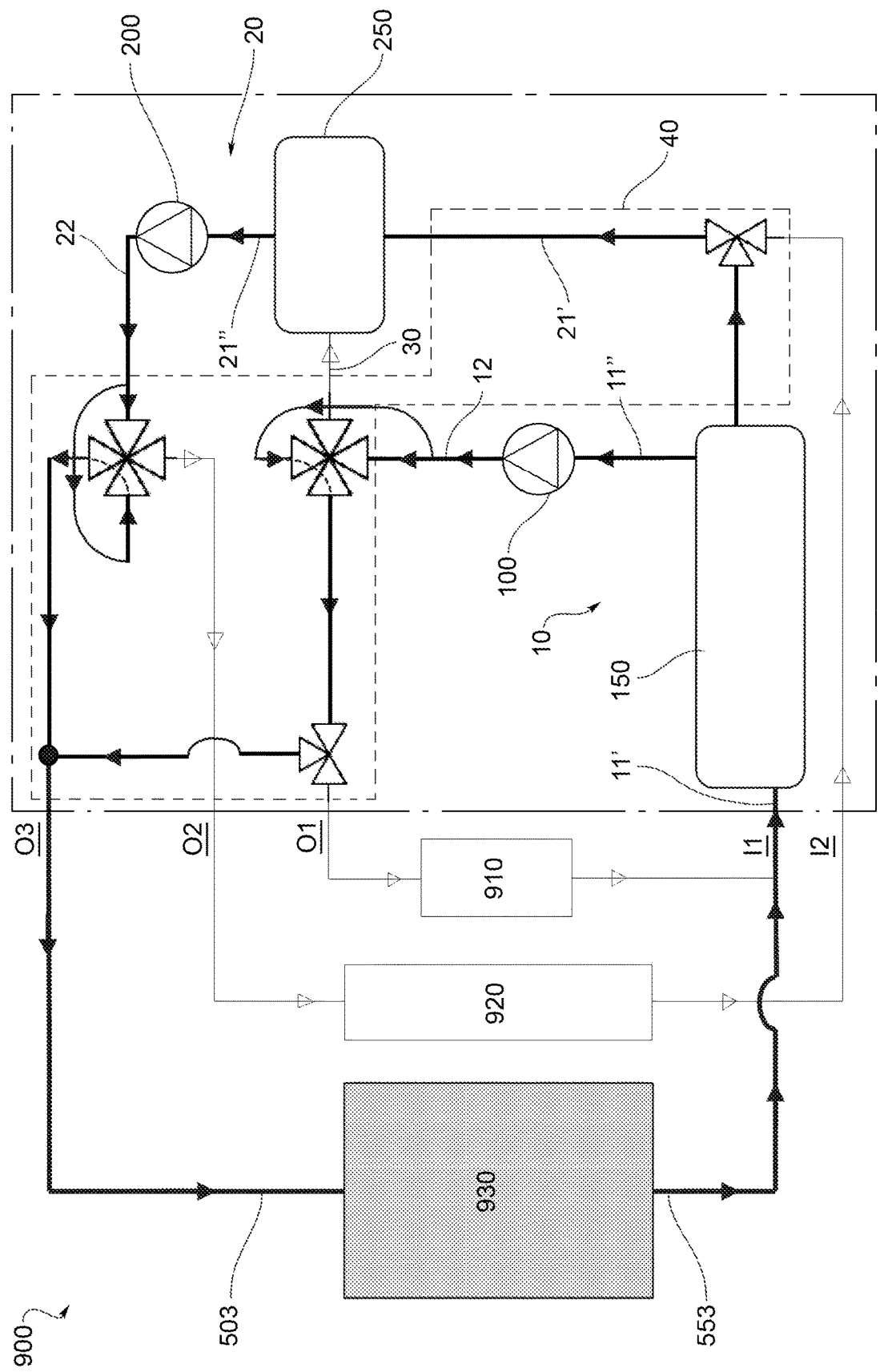
FIG.4"

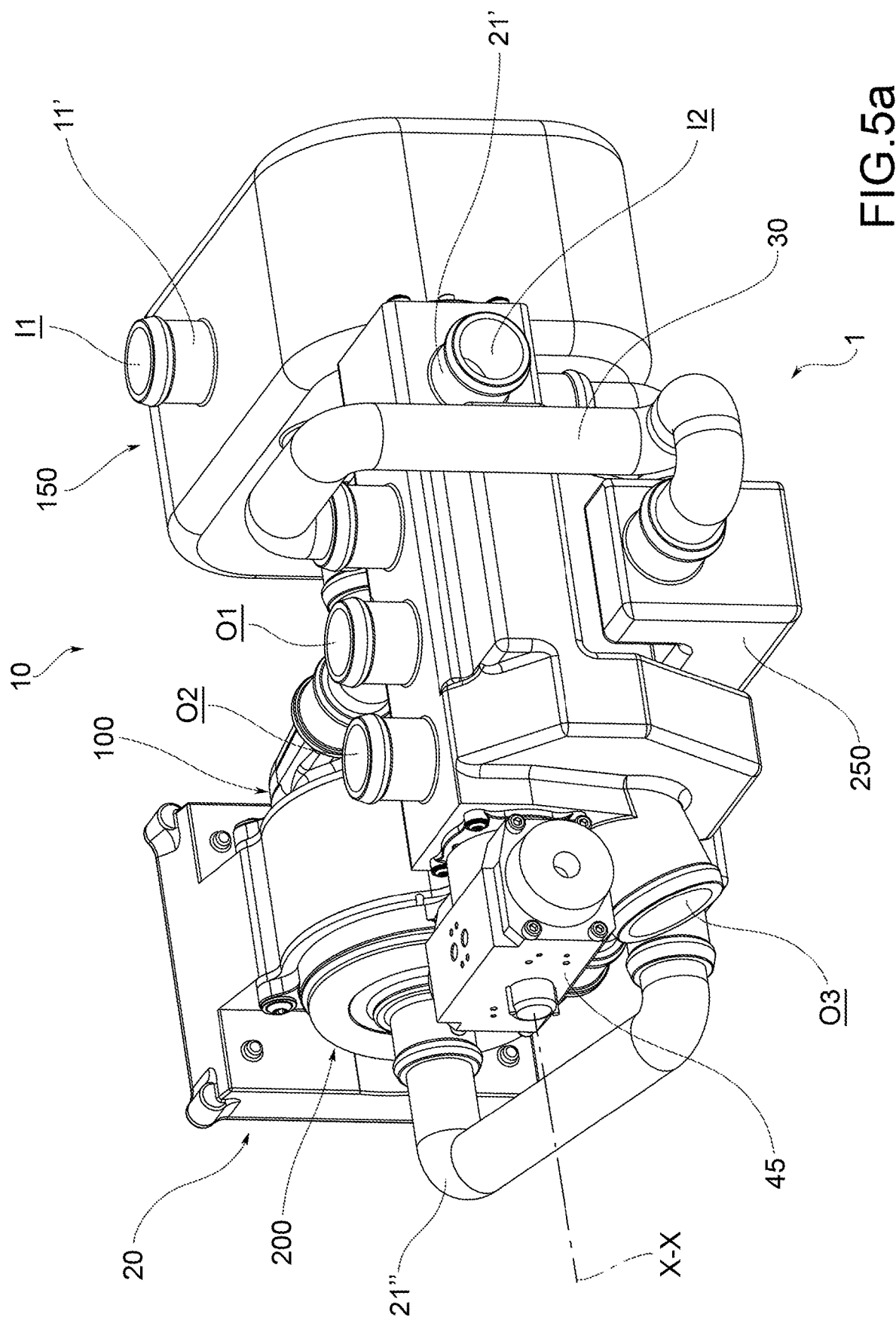

THERMAL MANAGEMENT ASSEMBLY OF A VEHICLE

CROSS-REFERENCE TO RELATED APPLICATIONS

This application is a National Phase Application of PCT International Application No. PCT/IB2020/058592, having an International Filing Date of Sep. 16, 2020, which claims priority to Italian Application No. 102019000018710 filed Oct. 14, 2019, each of which is hereby incorporated by reference in its entirety.

FIELD OF THE INVENTION

The present invention relates to a thermal management assembly of a thermal regulation system of a vehicle. In addition, it is in the object of the present invention also the thermal regulation system of a vehicle, which comprises said thermal management assembly. Furthermore, it is in the object of the present invention also the vehicle comprising said system and said thermal management assembly.

In other words, the present invention refers to the automotive sector and in detail to the thermal regulation system of a vehicle. In particular, the term "vehicle" refers to any transport means without any limitation linked to the type or size, i.e., a motor vehicle or a tractor trailer.

BACKGROUND OF THE INVENTION

In the state of the art, the need to manage the temperature of the vehicle operating groups is well known, so as to bring them and/or keep them at the best possible operating conditions (cooling and/or heating them). In particular, in the present discussion "operating group" means a specific component or group of components for the execution of a specific operation necessary for the motion of the vehicle. Therefore, for example, operating group means the endothermic motor group, or the battery group, or the gearbox group, or the transmission group or the electric motor group for managing the battery group.

In recent years, hybrid-powered vehicle solutions have proliferated, in which there are necessarily a plurality of operating groups such as the endothermic motor group, the battery group and the electric motor group connected to said battery group, in which each operating group has different needs from the other. In fact, each of said operating groups has different operating behaviors, both during the motion of the vehicle and in parking phases (for example, the electric motor operates in situations with the endothermic motor in standby). It is therefore evident that each operating group requires thermal management, cooling and/or heating, different with respect to the different operating situations of the vehicle.

Vehicle solutions are therefore known which comprise for each operating group a specific thermal regulation system, in which a specific amount of working fluid circulates. In these embodiments, each specific thermal regulation system is designed in its own, requiring specific components (for example specific pump groups).

Therefore, in this context the problem of having, managing, arranging, producing a plurality of thermal regulation systems in the same vehicle is evident.

The main problem, therefore, present in this sector is that of having, housing and managing within the same vehicle a multitude of components necessary for the thermal management of each operating group provided.

Due to the above, the need is strongly felt to solve the technical problems mentioned above.

SUMMARY OF THE INVENTION

The object of the present invention is therefore to provide a new thermal management assembly by which such need is satisfied.

Such object is achieved by a thermal management assembly, a thermal regulation system of a vehicle, and a vehicle as described and claimed herein.

Preferred embodiments involving further advantageous aspects are also described.

BRIEF DESCRIPTION OF THE DRAWINGS

Further features and advantages of the invention will become apparent from the description provided below of preferred exemplary embodiment thereof, given by way of non-limiting example, with reference to the accompanying drawings, in which:

FIGS. 5a and 5b show two perspective views of the thermal management assembly of the present invention in accordance with a preferred embodiment;

DETAILED DESCRIPTION

Figure 1:
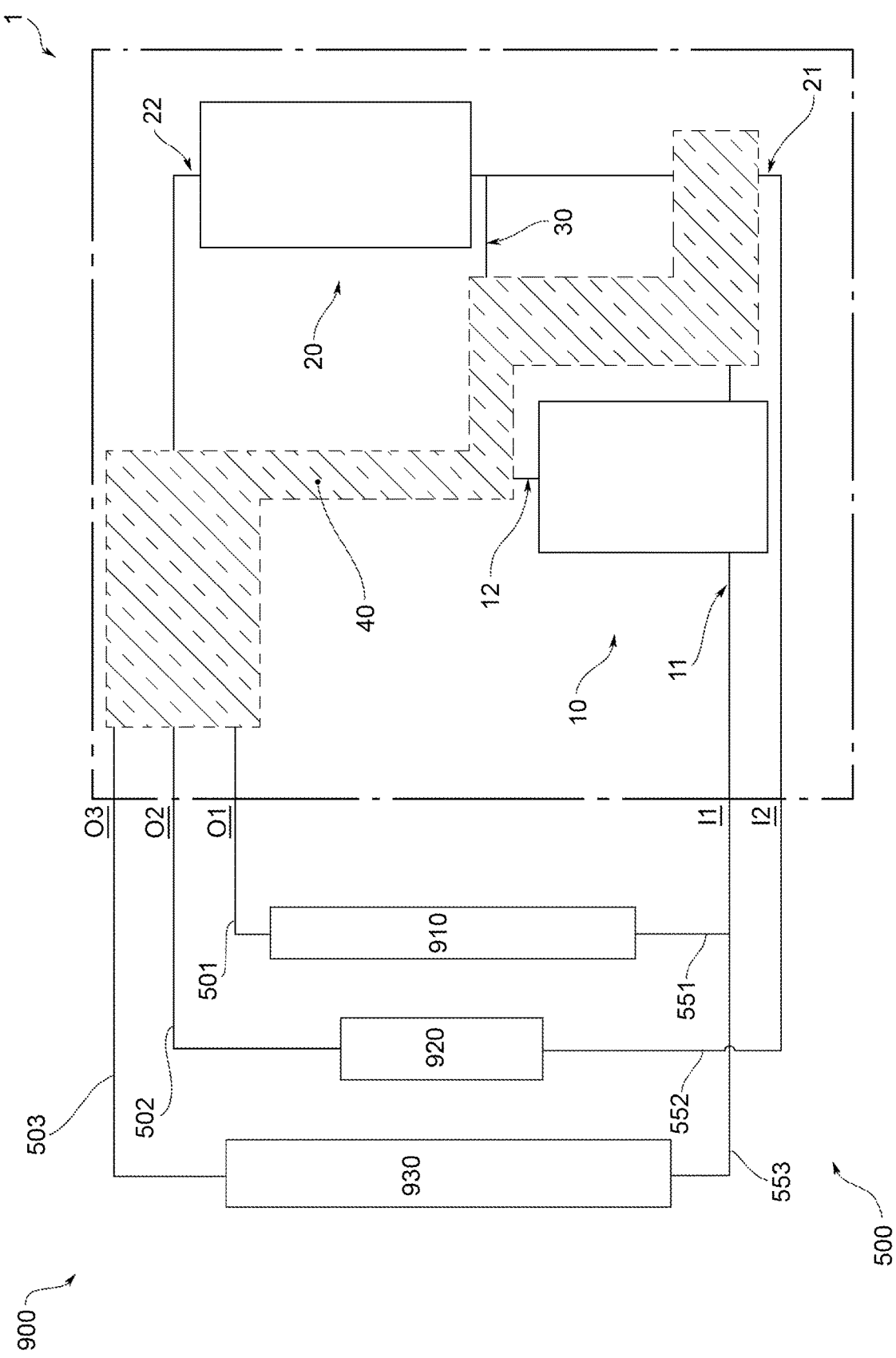
FIG. 1 shows a schematization of the thermal regulation system according to a preferred embodiment of the present invention.
Figure 2:
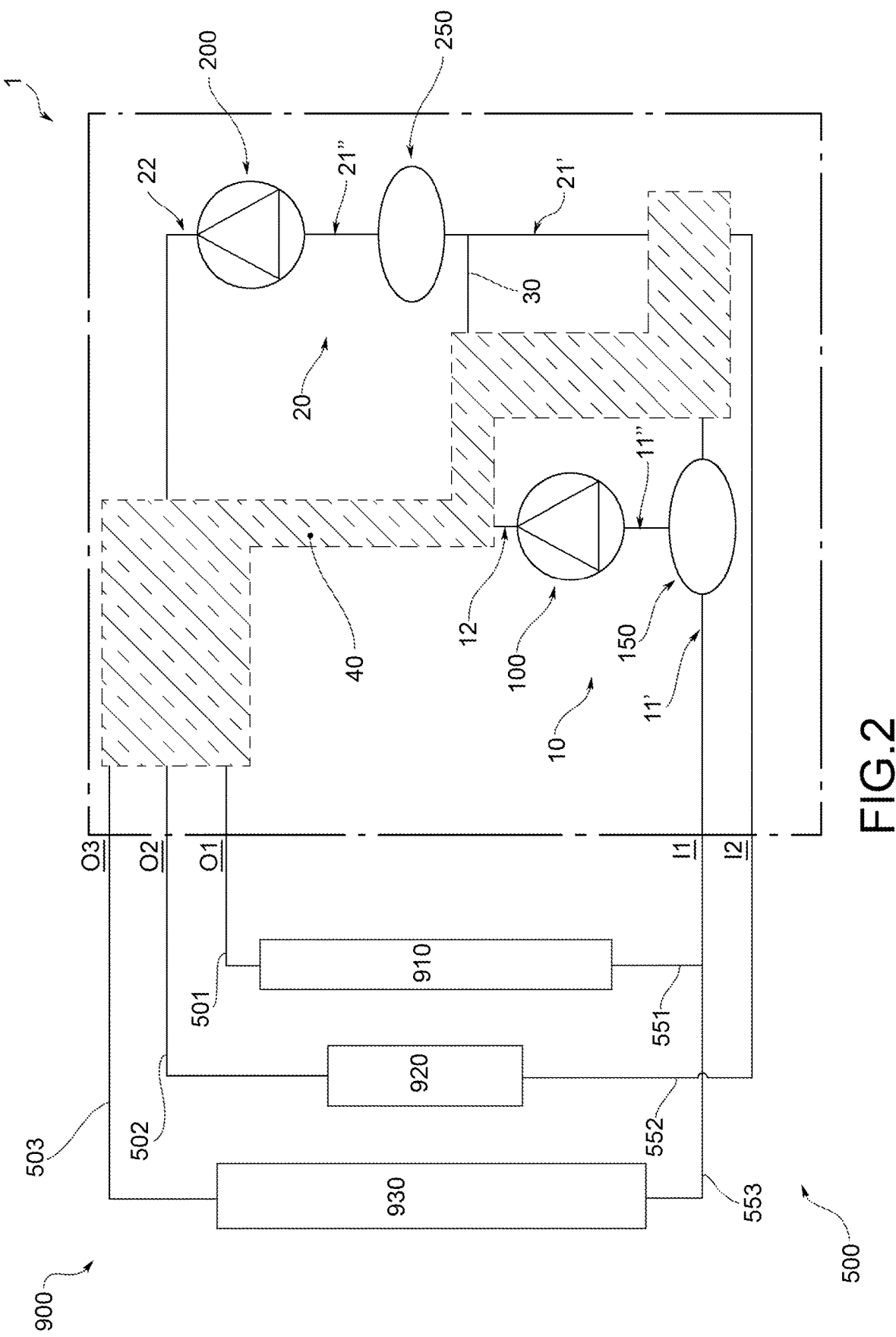
FIG. 2 shows a schematization of the thermal regulation system according to a further preferred embodiment of the present invention.
Figure 3:
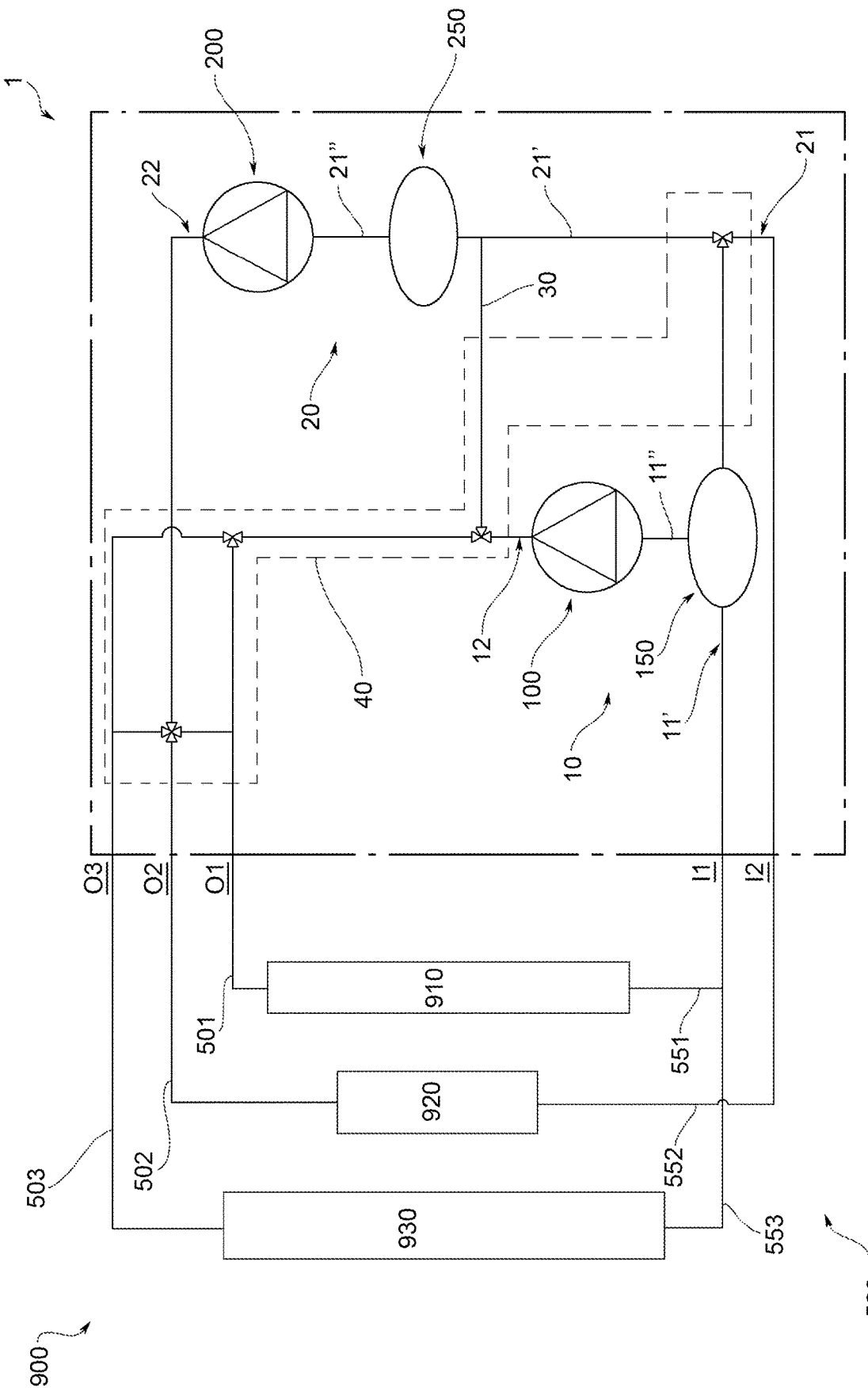
FIG. 3 shows a schematization of the thermal regulation system according to a still further preferred embodiment of the present invention.

With reference to the attached figures, the reference numeral 1 indicates a thermal management assembly of a thermal regulation system 500 of a vehicle 900, in accordance with the present invention.

The object of the present invention is also the thermal regulation system 500, which comprises the thermal management assembly 1.

Not shown, except in diagrammatic form, but object of the present invention, is also a vehicle 900 comprising the thermal regulation system 500. Preferably, said vehicle 900 is hybrid-powered, i.e., it combines both the power supply of an electric motor group and the power supply of a battery group.

In accordance with the present invention, the vehicle 900 comprises a first operating group 910, a second operating group 920 and a third operating group 930.

Each operating group corresponds to a "load". In particular, each operating group corresponds to a respective component or group of components comprised in the vehicle 900 and preferably forming part of the power supply of the vehicle 900.

Preferably, the first operating group 910 is an electric motor group.

Preferably, the second operating group 920 is a battery group.

Preferably, the third operating group 930 is an endothermic motor group.

According to the present invention, the first operating group 910, the second operating group 920 and the third operating group 930 are fluidically in connection with the thermal regulation system 500.

Preferably, the first operating group 910, the second operating group 920 and the third operating group 930 are fluidically connected by means of a plurality of system ducts 501, 502, 503, 551, 552, 553 comprised in the thermal regulation system 500. Preferably, specific heat exchanger units (not shown) are also comprised in the thermal regulation system 500.

In accordance with a preferred embodiment, the thermal regulation system 500 comprises at least one system inlet duct and at least one system outlet duct in fluidic connection with each operating group.

According to the present invention, the thermal management assembly 1 comprises a first pump group 10 suitable to command the movement of the working fluid comprising a first inlet duct 11 and a first outlet duct 12.

Furthermore, according to the present invention, the thermal management assembly 1 comprises a second pump group 20 suitable, in turn, to command the movement of the working fluid comprising a second inlet duct 21 and a second outlet duct 22.

In accordance with a preferred embodiment, the first pump group 10 comprises a first command unit 100 comprising a first impeller, which intercepts working fluid flowing in the first inlet duct 11 to send it into the first outlet duct 12. Preferably, said first impeller is of the radial type, axially aspirating working fluid through the first inlet duct 11 to push it out tangentially towards the first outlet duct 12.

According to a preferred embodiment, the first pump group 10 further comprises a first stabilization tank 150, which divides the first inlet duct 11 into a section upstream of the first duct 11' and a section downstream of the first duct 11". In particular, said first stabilization tank 150 uniforms the pressure of the flowing liquid before it reaches the first impeller comprised in the first command unit 100.

Therefore, i.e., the working fluid reaches the first command unit 100 after having flowed into the first stabilization tank 150.

In accordance with a preferred embodiment, the second pump group 20 comprises a second command unit 200 comprising a second impeller, which intercepts working fluid flowing in the second inlet duct 21 to send it into the second outlet duct 22. Preferably, said second impeller is of the radial type, axially aspirating working fluid through the second inlet duct 21 to push it out tangentially towards the second outlet duct 22.

According to a preferred embodiment, the second pump group 20 further comprises a second stabilization tank 250, which divides the second inlet duct 21 into a section upstream of the second duct 21' and a section downstream of a second duct 21". In particular, the second stabilization tank 250 uniforms the pressure of the flowing liquid before it reaches the second impeller comprised in the second command unit 200.

Therefore, i.e., the working fluid reaches the second command unit 200 after having flowed into the second stabilization tank 250.

In accordance with a variant embodiment, the thermal management assembly 1 comprises a single stabilization tank fluidically connected both with the first pump group 10 and with the second pump group 20.

According to the present invention, moreover, the thermal management assembly 1 further comprises an auxiliary duct 30, which fluidically connects the first pump group 10 and the second pump group 20.

Preferably, the auxiliary duct 30 fluidically connects the first outlet duct 12 with the second inlet duct 21.

Preferably, the auxiliary duct 30 fluidically connects the first outlet duct 12 with the second inlet duct 21, upstream of the second stabilization tank 250, i.e., preferably in the section upstream of the second duct 21'.

In accordance with a preferred embodiment, in a predefined configuration, by means of said auxiliary duct 30, the first pump group 10 and the second pump group 20 are fluidically arranged in series.

The thermal management assembly 1 according to the present invention further comprises a first inlet I1 and a second inlet I2 respectively fluidically connected with the first inlet duct 11 and with the second inlet duct 21.

Preferably, said first inlet I1 and said second inlet I2 are fluidically connectable with the first operating group 910, with the second operating group 920 and with the third operating group 930. Preferably, in fact, the first inlet I1 and said second inlet I2 are fluidically connectable with the system outlet ducts 551, 552, 553 comprised in the thermal regulation system 500.

According to a preferred embodiment, at least two system outlet ducts 551, 552, 553 are fluidically connected upstream of the first inlet I1 or of the second inlet I2 so that the working fluid flows into the same outlet upstream thereof.

In some embodiments, the thermal management assembly further comprises other system inlets fluidically connectable with the system ducts.

According to the present invention, the thermal management assembly 1 further comprises a first outlet O1, a second outlet O2 and a third outlet O3.

Said first outlet O1, said second outlet O2 and said third outlet O3 are fluidically connected with the first outlet duct 12 and with the second outlet duct 22.

Furthermore, said first outlet O1, said second outlet O2 and said third outlet O3 are respectively fluidically connectable with the first operating group 910, with the second operating group 920 and with the third operating group 930. In other words, with the thermal regulation system 500 installed in the vehicle 900, the working fluid exiting one of the three outlets flows towards a respective operating group.

In accordance with a preferred embodiment, the thermal management assembly 1 further comprises a fluidic command device 40 suitable to command the direction of predefined amounts of working fluid in flow in the thermal management assembly 1. In particular, the fluidic command device 40 is suitable to manage the flow modalities of the working fluid towards an outlet (preventing the flow towards the others) or towards more than one outlet at the same time.

In particular, the fluidic command device 40 is fluidically connected with the first pair of ducts 11, 12 with the second pair of ducts 21, 22 and with the auxiliary duct 30. In this manner, the fluidic command device 40 is suitable to manage in which of these ducts the working fluid flows.

Preferably, the fluidic command device 40 is suitable to be fluidically connectable with the described pump groups and with the described operating groups.

In accordance with a preferred embodiment, the fluidic command device 40 comprises the first outlet O1, a second outlet O2 and a third outlet O3.

Furthermore, the fluidic command device 40 is fluidically connected with the first outlet duct 12 and with the second outlet duct 22. Preferably, the fluidic command device 40 is also fluidically connected with the first inlet duct 11 and/or with the second inlet duct 21. Preferably, the fluidic command device 40 is fluidically connected with the auxiliary duct 30.

Specifically, the fluidic command device 40 is configurable in:
- a first working configuration in which the flow of the working fluid moved both by the first pump group 10 and by the second pump group 20 is regulated through the first outlet O1 and the second outlet O2, and the flow of the working fluid through the third outlet O3 and through the auxiliary duct 30 is prevented;
- a second working configuration in which the flow of the working fluid moved both by the first pump group 10 and by the second pump group 20 is regulated through the third outlet O3 and the flow of the working fluid through the first outlet O1, through the second outlet O2 and through the auxiliary duct 30 is prevented;
- a third working configuration in which the flow of the working fluid from the first pump group 10 to the second pump group 20 is regulated through the auxiliary duct 30 and the flow of the working fluid exiting through the second outlet O2 is regulated, while the flow of the working fluid through the first outlet O1 and through the third outlet O3 is prevented.

Figure 4:
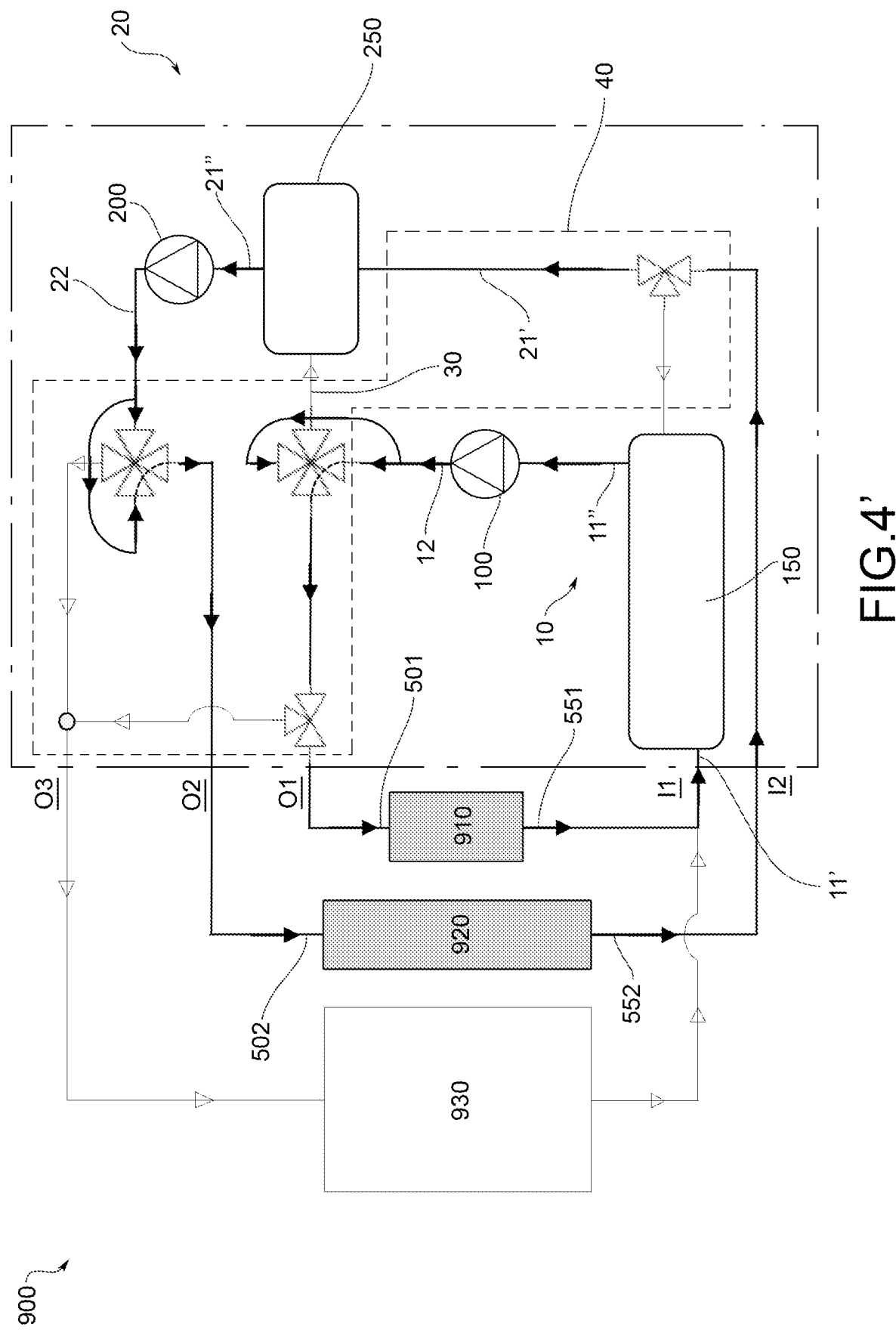
FIGS. 4', 4" and 4''' show three schematizations of the thermal regulation system according to the embodiment of FIG. 3, in three respective different operating configurations.
Figure 4:
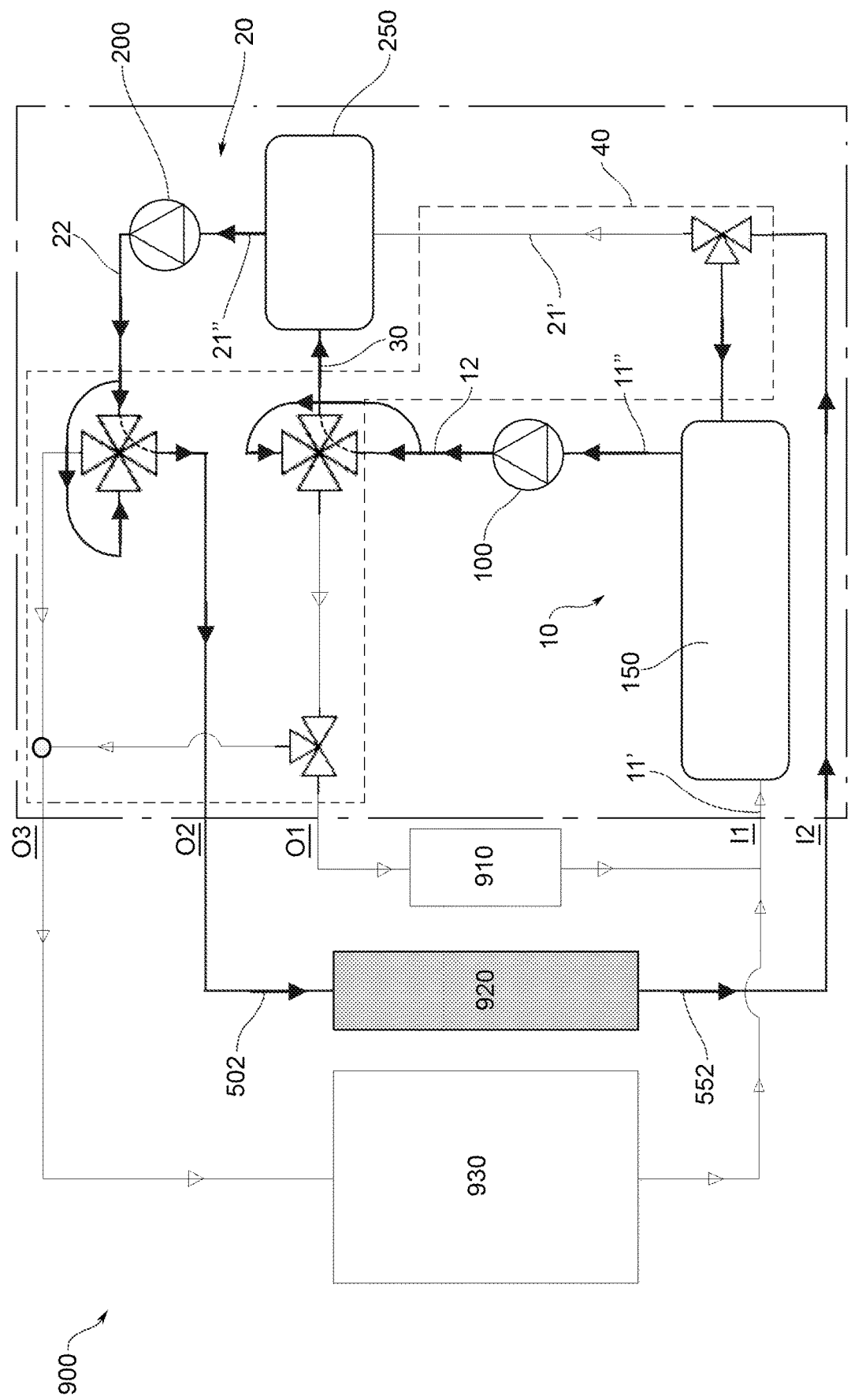
Figure 5B:
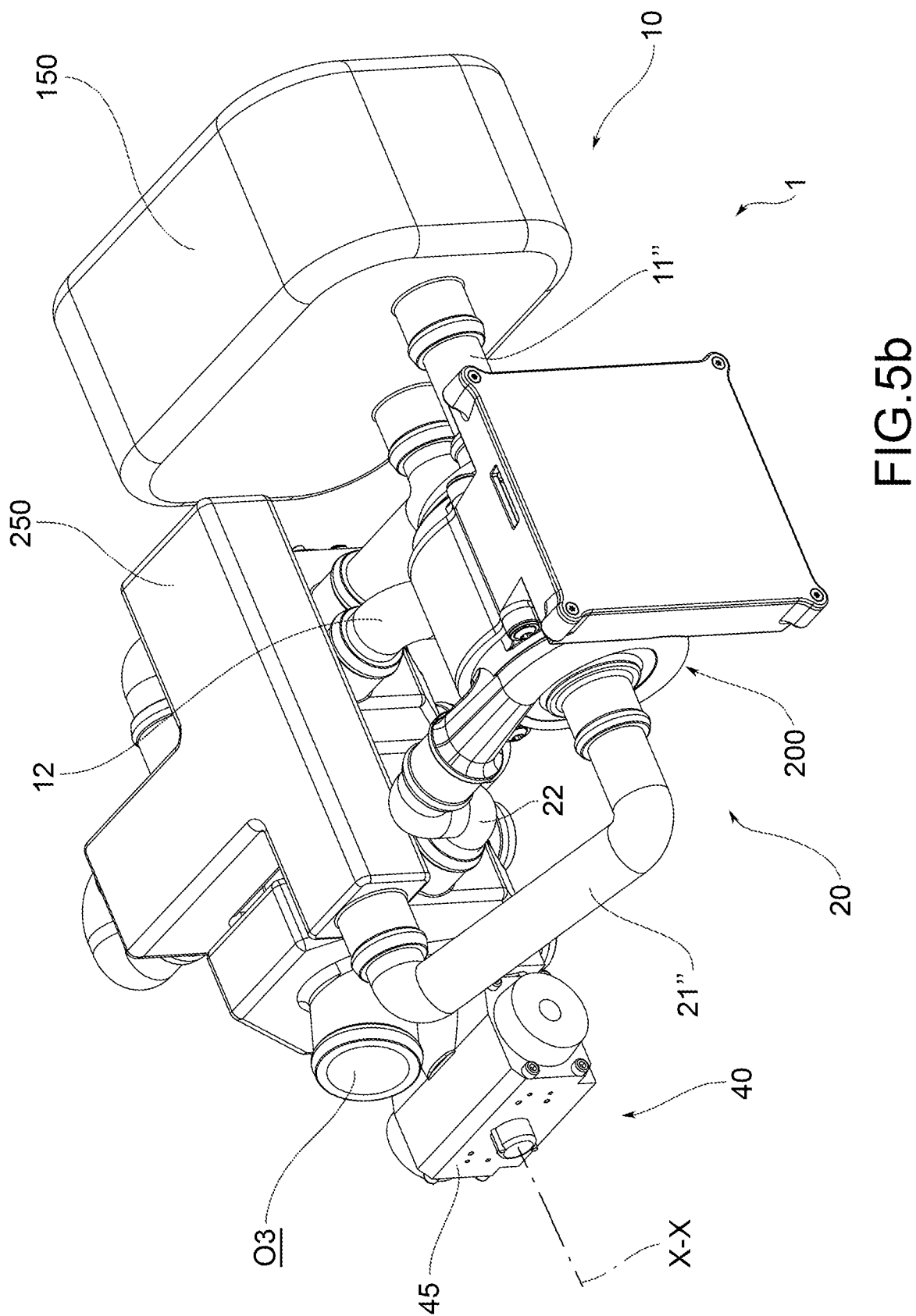
Figure 6:
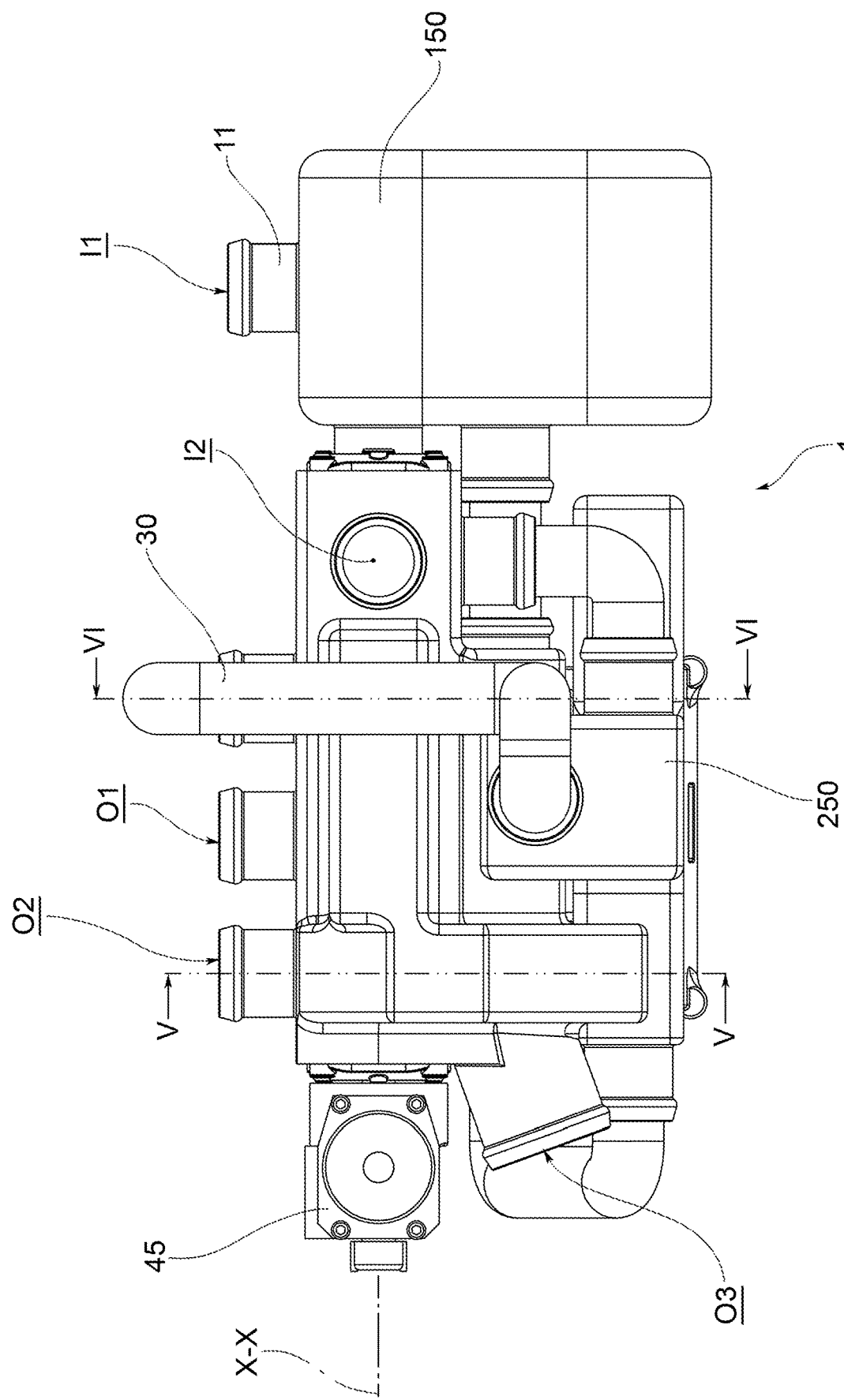
FIG. 6 is a side view of the thermal management assembly of FIGS. 5a and 5b.
Figure 7:
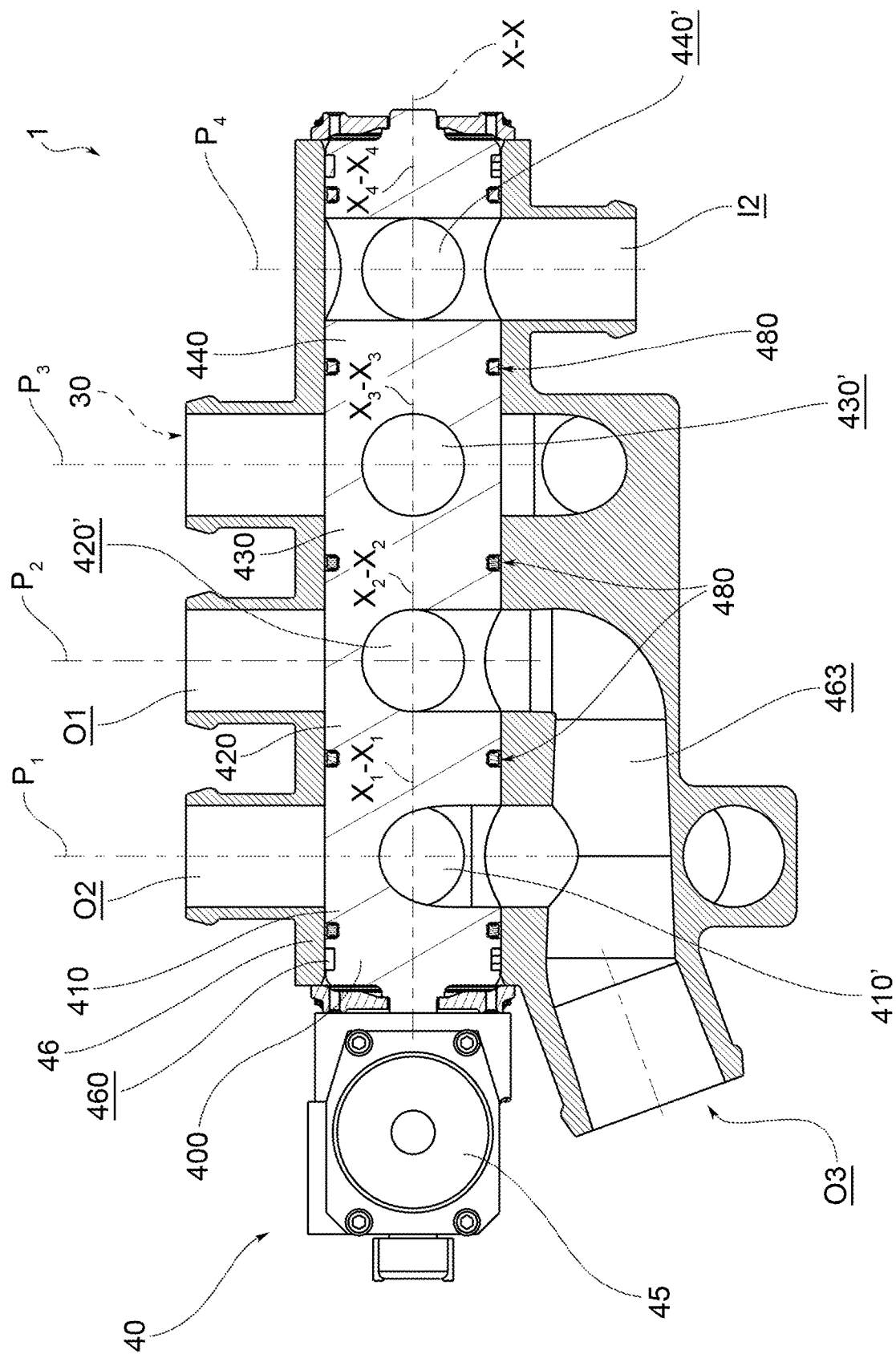
FIG. 7 is a longitudinal sectional view of the thermal management assembly of FIG. 6.
Figure 8A:
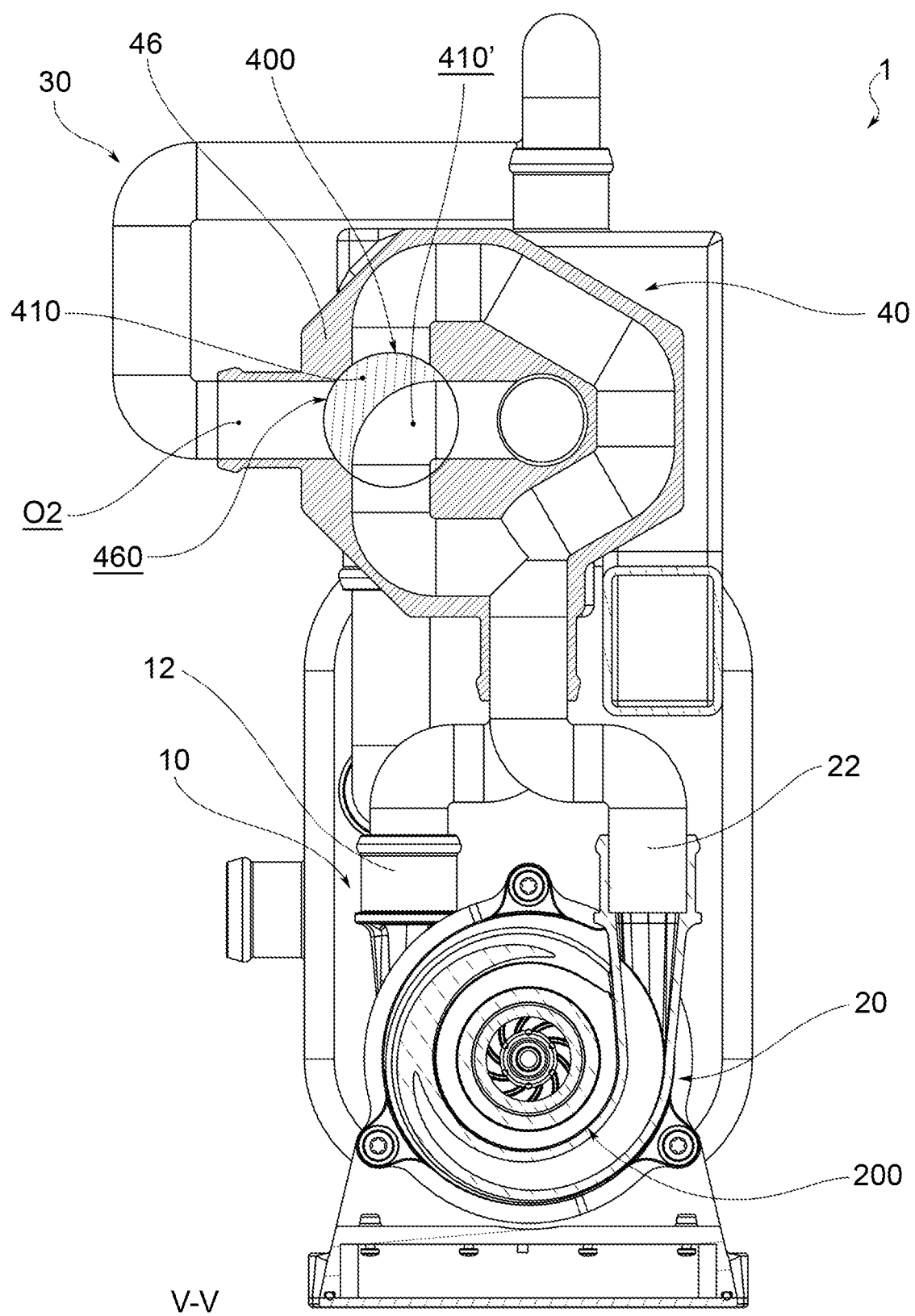
FIGS. 8a and 8b are two cross-section views of the thermal management assembly according to the section planes V-V and VI-VI of FIG. 6.
Figure 8B:
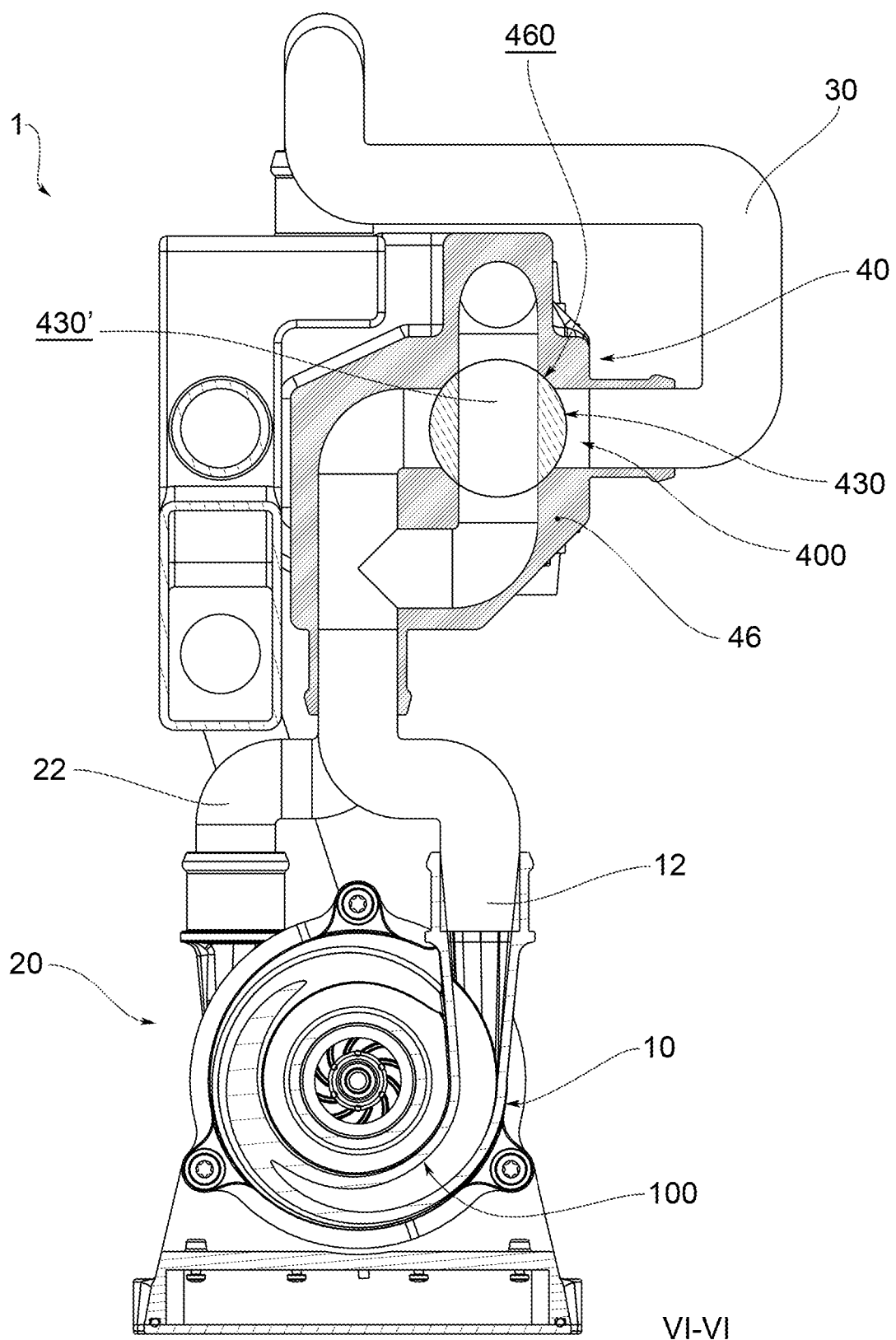
Figure 9:
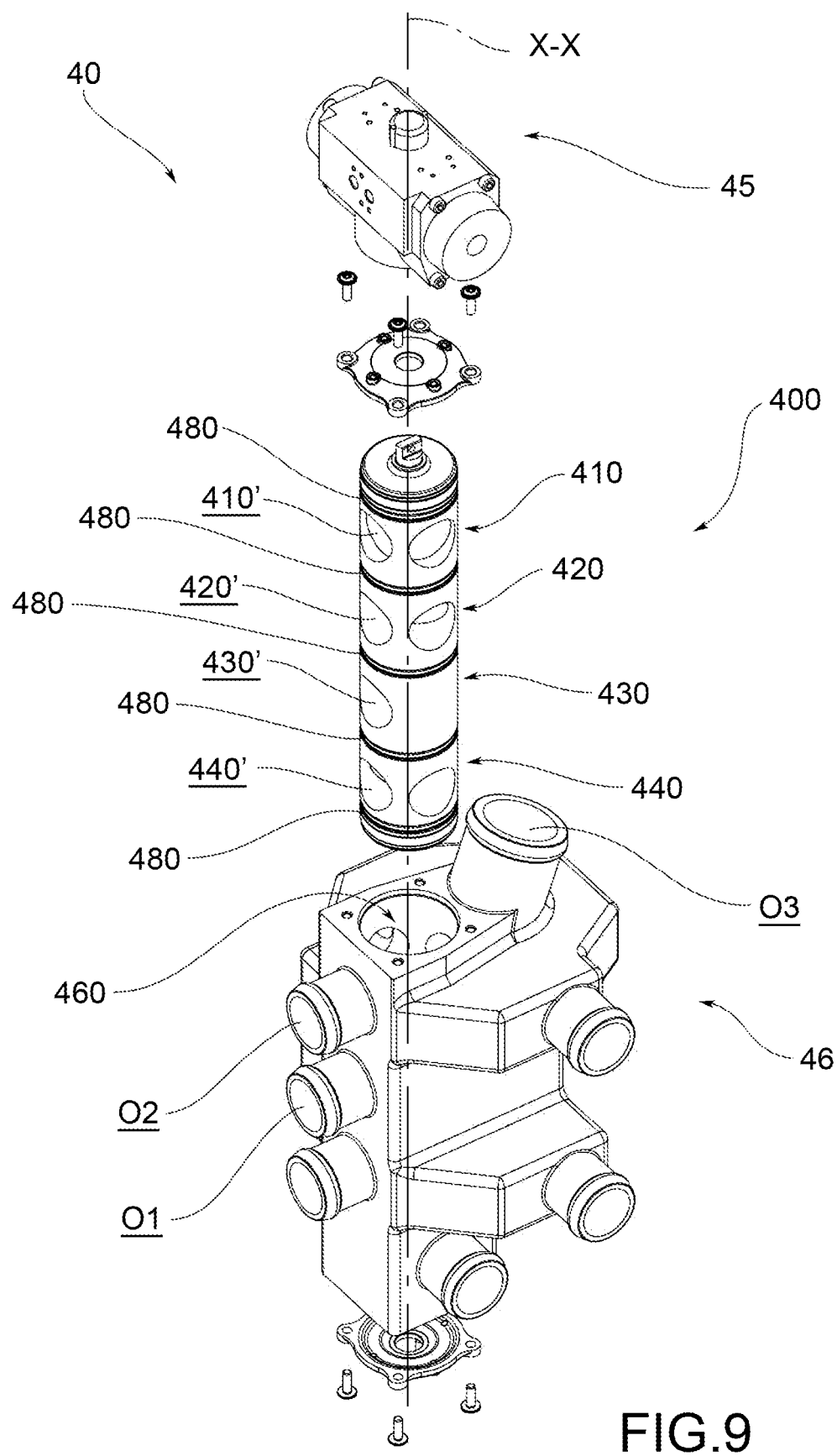
FIG. 9 shows a perspective view with separate parts of the fluidic command device comprised in the thermal management assembly of the preceding figures.

Preferably, the first working configuration is diagrammatically shown, by way of example, in FIG. 4'.

In the first working configuration, the fluidic command device 40 is configured so as to have two fluidic circuits separated from each other, respectively suitable to supply working fluid to the first operating group 910 and to the second operating group 920.

Preferably, the second working configuration is diagrammatically shown, by way of example, in FIG. 4".

In the second working configuration, the fluidic command device 40 is configured so as to have the two pump groups 10, 20 operating in parallel to supply working fluid to the third operating group 930 only.

Preferably, the third working configuration is diagrammatically shown, by way of example, in FIG. 4'".

In the third working configuration, the fluidic command device 40 is configured so as to have the two pump groups 10, 20 operating in series with each other to supply working fluid to the second operating group 920 only.

According to a preferred embodiment, the fluidic command device 40 comprises a plurality of command valve elements 410, 420, 430, 440 fluidically positioned transversely to a respective duct. In accordance with what has been described above, each working configuration corresponds to the adjustment of each command valve element 410, 420, 430, 440 in a predefined position.

In other words, the fluidic command device 40 comprises a command valve element 410, 420, 430, 440 at a respective duct, or at several ducts fluidically connected by the fluidic command device 40, or at two duct sections separated from each other by the fluidic command device 40.

In accordance with a preferred embodiment, each command valve element 410, 420, 430, 440 is therefore fluidically connected with a respective inlet hole and a respective outlet hole for the fluidic connection. Preferably, some command valve elements are fluidically connected with more than one inlet and more than one outlet. Said inlet holes and outlet holes are, as shown in the attached figures, comprised in the fluidic command device 40 itself, for example in the device body 46 described below.

According to a preferred embodiment, each command valve element 410, 420, 430, 440 comprises a command axis X1-X1, X2-X2, X3-X3, X4-X4 with respect to which it is adjustable.

Preferably, each command valve element 410, 420, 430, 440 is adjustable in a different angular position with respect to each respective command axis. In other words, each command valve element 410, 420, 430, 440 is positionable in a preferred angular position, in which it commands the passage of the respective amount of working liquid towards a respective outlet O1, O2, O3.

Preferably, each command valve element 410, 420, 430, 440 has an internal command section 410', 420', 430', 440' through which the working fluid flows and as a function of the angular position of the command valve element 410, 420, 430, 440 allows or inhibits the fluidic communication between at least one inlet opening with at least one outlet opening (mutually, fluidically connected to a respective duct or section of duct) according to the positioning thereof. Specifically, said command section 410', 420', 430', 440' is a passage passing through a solid body. Preferably, the alignment of the command section 410', 420', 430', 440' with the respective inlet and outlet holes involves the passage of the working fluid, vice versa the misalignment prevents the passage of the working fluid.

Preferably, each command section 410', 420', 430', 440' extends perpendicularly with respect to the respective command axis X1-X1, X2-X2, X3-X3, X4-X4. Preferably, each solid body of each command valve element 410, 420, 430, 440 has an axial symmetrical extension. Preferably, each solid body of each command valve element 410, 420, 430, 440 is cylindrical or spherical.

In accordance with a preferred embodiment, each command section 410', 420', 430', 440' extends lying on a respective imaginary plane P1, P2, P3, P4. Preferably, each imaginary plane P1, P2, P3, P4 is substantially orthogonal to a respective command axis X1-X1, X2-X2, X3-X3, X4-X4.

According to a preferred embodiment, the fluidic command device 40 comprises a main axis X-X. Preferably, the fluidic command device 40 extends in length along said main axis X-X.

In accordance with a preferred embodiment, each command axis X1-X1, X2-X2, X3-X3, X4-X4 lies on said main axis X-X. In accordance with a preferred embodiment, each imaginary plane P1, P2, P3, P4 is orthogonal to the main axis X-X.

In accordance with a preferred embodiment, the fluidic command device 40 comprises a main adjustment member 400 comprising, mutually integrally connected to each other, the command valve elements 410, 420, 430, 440.

Preferably, the main adjustment member 400 consists of the solid bodies of each command valve element 410, 420, 430, 440.

In other words, the union of the solid bodies of each command valve element 410, 420, 430, 440 composes the main adjustment member 400.

According to a preferred embodiment, the main adjustment member 400, between one command valve element and the other comprises gasket elements 480 suitable for keeping the respective fluidic amounts managed by each command valve element 410, 420, 430, 440 separate.

In accordance with a preferred embodiment, the main adjustment member 400 has the shape of a single cylinder, which extends with respect to the main axis X-X.

According to a preferred embodiment, the fluidic command device 40 comprises a command member 45 suitable to adjust the angular position of each command valve element 410, 420, 430, 440 with respect to the respective command axis X1-X1, X2-X2, X3-X3, X4-X4.

Preferably, the command member 45 simultaneously commands the position of each command valve element 410, 420, 430, 440.

Preferably, in the embodiment with the single main adjustment member 400 as union of the plurality of command valve elements 410, 420, 430, 440, the command member 45 commands the position of the main adjustment member 400 with respect to the main axis X-X.

Preferably, the command member 45 is an electric motor connected to a relative inverter suitable to monitor the relative angular position.

In accordance with a preferred embodiment, the thermal management assembly 1 comprises a device body 46 fluidically connected with the first outlet duct 12 and with the second outlet duct 22 to receive the working fluid flowing in said ducts.

According to a preferred embodiment, the first outlet O1, the second outlet O2 and the third outlet O3 are obtained in said device body 46. The respective system inlet ducts 501, 502, 503 are connectable to said outlets, therefore, to said device body 46, by means of specific fittings.

In accordance with a preferred embodiment, the device body 46 houses, upstream of said outlets, said plurality of command valve elements 410, 420, 430, 440.

In other words, the inlet openings and the outlet openings are obtained in the device body 46, the passage of the working fluid of which is managed by positioning the respective command valve element.

WM In accordance with a preferred embodiment, the device body 46 is fluidically connected with the auxiliary duct 30 comprising a specific command valve element 430 commandable in a position in which it allows the flow of working fluid to pass and a position in which it inhibits it.

In other words, the device body 46 is crossed by the fluidic ducts mentioned above, comprising the command valve elements 410, 420, 430, 440 specially provided to manage the flow of the working fluid through one duct or the other.

In accordance with a preferred embodiment, the device body 46 comprises a single adjustment chamber, 460 which extends along the main axis X-X and houses the command valve elements 410, 420, 430, 440 mutually integrally connected to each other. Preferably, the main adjustment member 400 is housed in said adjustment chamber 460. Preferably, said adjustment chamber 460 is shaped so as to have complementary walls to the main body 400. Preferably the gasket elements 480 engage the walls delimiting the adjustment chamber 460.

Furthermore, in accordance with a preferred embodiment, the device body 46 comprises an adjustment chamber 463 fluidically connected with the third outlet and suitable to receive working fluid from the positioning of at least two command valve elements. That is to say, in a preferred embodiment, for example corresponding to the second working configuration of the fluidic command device 40, at least two command valve elements command the flow of working fluid arriving from the first outlet duct 12 and from the second outlet duct 22 towards said adjustment chamber 463 and thus towards the outlet O3.

Preferably, as shown by way of example, the fluidic command device 40 has extremely compact dimensions so as to be suitable to be housed in the motor compartment of a vehicle 900.

Preferably, the two pump groups have the features described in the document 102018000010971 in the name of the Applicant, as also shown by way of example in the accompanying drawings.

In addition, as already mentioned, the present invention also relates to a thermal regulation system 500 of a vehicle 900, which comprises a thermal management assembly 1 with the features described above. Said vehicle 900 comprises a first operating group 910, a second operating group 920 and a third operating group 930 while the thermal regulation system 500 comprises a plurality of system ducts 501, 502, 503, 551, 552, 553 suitable to be fluidically connected with the first operating group 910, the second operating group 920, and the third operating group 930. Furthermore, said system ducts 501, 502, 503, 551, 552, 553 are suitable to be fluidically connected with the described thermal management assembly 1.

The object of the present invention is also a vehicle 900 comprising a first operating group 910, for example an electric motor group, a second operating group 920, for example a battery group, a third operating group 930, for example an endothermic motor group, and said thermal regulation system 500.

The present invention also relates to a hybrid-powered vehicle 900 which comprises a first operating group 910 which consists of an electric motor group, a second operating group 920 which consists of a battery group and a third operating group 930 which consists of an endothermic motor group, and said thermal regulation system 500.

Innovatively, the thermal management assembly, the thermal regulation system of a vehicle, which comprises this regulation assembly, and the vehicle, which comprises said thermal regulation system amply fulfill the object of the present invention by solving the problems which emerged in the typical solutions of the state of the art.

Advantageously, in fact, the thermal management assembly of the present invention allows the adjustment of a plurality of operating groups of the vehicle.

Advantageously, the thermal management assembly of the present invention allows a simple management of the temperature of different operating groups of the vehicle, using only two pump groups.

Advantageously, the thermal management assembly is easily positionable in the vehicle, having compact dimensions and thus a smaller footprint.

Advantageously, the thermal management assembly is economical to produce.

Advantageously, the thermal management assembly of the present invention manages the temperature of the vehicle in an extremely effective and flexible manner.

Advantageously, the thermal management assembly of the present invention manages the temperature of the vehicle in a plurality of different operating conditions thereof, i.e., both in motion and stationary.

Advantageously, the thermal management assembly is suitable, in the first configuration, to manage the temperature of both the electric motor group and the battery group, i.e., the "electric propulsion part" of a vehicle. In other words, in vehicle movement conditions at low revolutions and/or low speeds, in which the vehicle is electrically powered, the thermal management assembly manages the temperature exclusively of said "electric propulsion part".

Advantageously, the thermal management assembly is suitable, in the second configuration, to manage the temperature of an operating group such as the endothermic motor group. In other words, in vehicle motion conditions at high revolutions and/or high speeds, in which the vehicle is endothermic, the thermal management assembly manages the temperature exclusively of said "endothermic propulsion part".

Advantageously, the thermal management assembly is suitable, in the second configuration, to manage the temperature of an operating group such as the endothermic motor group thanks to a double flow rate of working fluid.

Advantageously, the thermal management assembly is suitable, in the third configuration, to manage the temperature of an operating group with high pressure drops, as the battery group, thanks to a double prevalence.

Advantageously, in this configuration the temperature of the battery group is managed separately from the temperature management of the electric motor group and the endothermic motor group; for example, this configuration applies to situations in which the vehicle is parked, for example in the phases of recharging the battery group, or in the ignition phases of the vehicle and of the battery group.

Advantageously, the management of the flows in the ducts and in the circuits is extremely simplified.

Advantageously, with simple rotational operations, the fluidic command device is suitable to pass from one configuration to another. Advantageously, with a single rotational operation, the fluidic command device is configurable in a desired working configuration.

It is apparent that, in order to meet contingent needs, those skilled in the art could make changes to the thermal management assembly and to the thermal regulation system as well as to the vehicle, all of which fall within the scope of protection as defined by the following claims.

What is claimed is:

1. A thermal management assembly of a thermal regulation system of a vehicle, wherein said vehicle comprises a first operating group, a second operating group, and a third operating group fluidically connectable to said thermal management assembly, wherein the thermal management assembly comprises:
   a first pump group configured to command a movement of a working fluid in the thermal management assembly, said first pump group comprising a first inlet duct and a first outlet duct;
   a second pump group configured to command the movement of the working fluid in the thermal management assembly, said second pump group comprising a second inlet duct and a second outlet duct;
   an auxiliary duct fluidically connecting the first pump group and the second pump group;
   a first inlet and a second inlet respectively fluidically connected with to the first inlet duct and to the second inlet duct;
   a first outlet, a second outlet and a third outlet fluidically connected to the first outlet duct and to the second outlet duct, respectively connectable to the first operating group, the second operating group and the third operating group; and
   a fluidic command device fluidically connected to the first inlet and outlet ducts, to the second inlet and outlet ducts and to the auxiliary duct, wherein the fluidic command device is configurable in:
   a first working configuration in which a flow of the working fluid moved by the first pump group and by the second pump group is regulated through the first outlet and the second outlet and the flow of the working fluid through the third outlet and through the auxiliary duct is prevented;
   a second working configuration in which the flow of the working fluid moved by the first pump group and the second pump group is regulated through the third outlet, and the flow of the working fluid through the first outlet, the second outlet and through the auxiliary duct is prevented; and
   a third working configuration in which the flow of the working fluid from the first pump group to the second pump group is regulated through the auxiliary duct and the flow of the working fluid exiting through the second outlet is regulated, while the flow of the working fluid through the first outlet and the third outlet is prevented.

2. The thermal management assembly of claim 1, wherein the first pump group comprises:
   a first command unit comprising a first impeller that intercepts the working fluid flowing in the first inlet duct to send the working fluid into the first outlet duct; and
   a first stabilization tank that divides the first inlet duct into a section upstream of the first inlet duct and a section downstream of the first inlet duct.

3. The thermal management assembly claim 1, wherein the second pump group comprises:
   a second command unit comprising a second impeller that intercepts the working fluid flowing in the second inlet duct to send the working fluid into the second outlet duct; and
   a second stabilization tank that divides the second inlet duct into a section upstream of the second inlet duct and a section downstream of the second inlet duct.

4. The thermal management assembly of claim 1, wherein the auxiliary duct fluidically connects the first outlet duct to the second inlet duct.

5. The thermal management assembly claim 1, wherein the fluidic command device comprises a plurality of command valve elements fluidically positioned transversely to a respective duct, wherein each working configuration corresponds to a regulation of each command valve element in a predefined position.

6. The thermal management assembly of claim 5, wherein each command valve element comprises a command axis and each command valve element is adjustable in a different angular position with respect to each respective command axis.

7. The thermal management assembly of claim 6, wherein the fluidic command device comprises a main axis, wherein each command axis lies on said main axis.

8. The thermal management assembly of claim 6, wherein the fluidic command device further comprises a command member suitable for adjusting the angular position of each command valve element with respect to the respective command axis.

9. The thermal management assembly of claim 7, wherein the fluidic command device further comprises a main adjustment member comprising, mutually integrally connected to each other, the command valve elements.

10. The thermal management assembly of claim 6, wherein each command valve element comprises a command section through which the working fluid flows and as a function of the angular position of each command valve element allows or inhibits fluidic communication between at least one inlet opening and at least one outlet opening.

11. The thermal management assembly of claim 1, wherein the fluidic command device comprises a plurality of command valve elements fluidically positioned transversely to a respective duct, wherein each working configuration corresponds to a regulation of each command valve element in a predefined position, said thermal management assembly further comprising a device body fluidically connected to the first outlet duct and to the second outlet duct to receive the working fluid flowing in said first and second outlet ducts, wherein in said device body the first outlet, the second outlet and the third outlet are formed, and wherein the device body houses, upstream of said first, second and third outlets, said plurality of command valve elements.

12. The thermal management assembly of claim 11, wherein the device body is fluidically connected to the auxiliary duct comprising a command valve element controllable in a position in which it allows passage of the flow of the working fluid and a position in which it inhibits passage of the flow of the working fluid.

13. The thermal management assembly of claim 11, wherein the device body comprises a regulation chamber fluidically connected to the third outlet and suitable for receiving the working fluid from positioning of at least two command valve elements.

14. The thermal management assembly of claim 11 wherein the fluidic command device further comprises a main adjustment member comprising, mutually integrally connected to each other, the command valve elements, and wherein the device body comprises a single regulation chamber that extends along the main axis and houses the command valve elements mutually integrally connected to each other.

15. A thermal regulation system of a vehicle, wherein said vehicle comprises a first operating group, a second operating group, and a third operating group, wherein said thermal regulation system comprises:
  a plurality of system ducts fluidically connected to the first operating group, the second operating group, and the third operating group; and
  a thermal management assembly according to claim 1, fluidically connected to said plurality of system ducts.

16. A vehicle comprising a first operating group, a second operating group, a third operating group, and a thermal regulation system according to claim 15.

17. The vehicle of claim 16, wherein said vehicle is a hybrid-powered vehicle, and wherein the first operating group comprises an electric engine group, the second operating group comprises a battery group, and the third operating group comprises an endothermic engine group.

18. The thermal management assembly of claim 3, wherein the auxiliary duct fluidically connects the first outlet duct to the second inlet duct upstream of the second stabilization tank.

* * * * *